United States Patent
Lee et al.

(10) Patent No.: US 8,601,151 B2
(45) Date of Patent: Dec. 3, 2013

(54) APPARATUS AND METHOD FOR RECEIVING DATA

(75) Inventors: Ji Hoon Lee, Anyang-si (KR); Byoung-Joon Lee, Seongnam-si (KR); Myeong Wuk Jang, Seoul (KR); Jae Hoon Kim, Yongin-si (KR); Joong-Hong Park, Seoul (KR); Sung-Chan Choi, Uijeongbu-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 426 days.

(21) Appl. No.: 12/881,298

(22) Filed: Sep. 14, 2010

(65) Prior Publication Data

US 2011/0072152 A1  Mar. 24, 2011

(30) Foreign Application Priority Data

Sep. 21, 2009 (KR) ........................ 10-2009-0088937

(51) Int. Cl.
*G06F 15/16* (2006.01)
(52) U.S. Cl.
USPC ............................ 709/235; 370/230; 370/235
(58) Field of Classification Search
USPC .................................. 709/235; 370/230, 235
See application file for complete search history.

(56) References Cited

U.S. PATENT DOCUMENTS

| | | | | |
|---|---|---|---|---|
| 5,682,325 A | * | 10/1997 | Lightfoot et al. | 709/229 |
| 7,336,659 B2 | * | 2/2008 | Meago | 370/390 |
| 7,602,709 B1 | * | 10/2009 | Cheng et al. | 370/230 |
| 8,055,793 B2 | * | 11/2011 | Guan | 709/241 |
| 2002/0194310 A1 | * | 12/2002 | Chu et al. | 709/219 |
| 2003/0007454 A1 | * | 1/2003 | Shorey | 370/229 |
| 2007/0288638 A1 | * | 12/2007 | Vuong et al. | 709/226 |
| 2008/0134258 A1 | * | 6/2008 | Goose et al. | 725/91 |
| 2008/0235370 A1 | * | 9/2008 | Choi et al. | 709/224 |
| 2009/0144412 A1 | * | 6/2009 | Ferguson et al. | 709/224 |
| 2009/0327489 A1 | * | 12/2009 | Swildens et al. | 709/224 |
| 2010/0011103 A1 | * | 1/2010 | Luzzatti et al. | 709/226 |
| 2010/0150161 A1 | * | 6/2010 | Saksena et al. | 370/400 |
| 2010/0228824 A1 | * | 9/2010 | Lin et al. | 709/204 |
| 2010/0332674 A1 | * | 12/2010 | van Gassel et al. | 709/231 |

FOREIGN PATENT DOCUMENTS

| | | |
|---|---|---|
| JP | 2006-202219 | 8/2006 |
| JP | 2008-299586 | 12/2008 |
| KR | 10-2007-0061268 | 6/2007 |
| KR | 10-2008-0084975 | 9/2008 |
| KR | 10-2009-0003180 | 1/2009 |

* cited by examiner

*Primary Examiner* — Duyen Doan
(74) *Attorney, Agent, or Firm* — NSIP Law

(57) ABSTRACT

An apparatus and method for receiving data over a network are provided. The data reception apparatus may include a receiver, a congestion decision unit and a suspension session selector. The receiver is configured to receive segments of data, using sessions corresponding to data transmissions apparatuses. The congestion detection unit is configured to determine whether a network to be utilized by a corresponding segment is congested, based on a status of each of the sessions. The suspension selector is configured to select a suspension session from the sessions where the network is determined to be congested.

17 Claims, 7 Drawing Sheets

APPARATUS AND METHOD FOR RECEIVING DATA

CROSS-REFERENCE TO RELATED APPLICATION(S)

This application claims the benefit under 35 U.S.C. §119 (a) of Korean Patent Application No. 10-2009-0088937, filed on Sep. 21, 2009, in the Korean Intellectual Property Office, the entire disclosure of which is incorporated herein by reference for all purposes.

BACKGROUND

1. Field

The following description relates to an apparatus and method for receiving data using a network.

2. Description of Related Art

The Internet is an open network that applies a common communication standardization scheme, for example, a transmission control protocol/Internet protocol (TCP/IP) scheme, and enables various types of services, including but not limited to, an information search, an e-mail, and a file transmission. In particular, as an Internet service may be provided at a high speed, various types of files, for example multimedia contents, may be sold and be distributed over the Internet.

A peer-to-peer scheme may be utilized to logically share resources, for example, systems and networks that are distributed to nodes. In the peer-to-peer scheme, nodes may directly share information without depending on a particular server. Accordingly, it may be possible to reduce large amounts of additional costs which may occur due to an operation of an existing server-client model. Where information is shared between nodes, a single node may arbitrarily construct a plurality of data sessions with nodes of a correspondent data transmission apparatus. Accordingly, it may be possible to enhance a data rate and a data performance.

SUMMARY

In one general aspect, there is provided an apparatus for receiving data, the apparatus including a receiver configured to receive, from data transmission apparatuses, segments of data, using sessions corresponding to the data transmission apparatuses, a congestion decision unit configured to determine whether a network to be utilized by a corresponding segment is congested, based on a status of each of the sessions, and a suspension session selector configured to select a suspension session from the sessions where the network is determined to be congested. The receiver is further configured to suspend reception of the corresponding segment with respect to the suspension session during a waiting time.

The apparatus for receiving data may further include a buffer map generator configured to generate a buffer map including information associated with at least one data transmission apparatus including the segments among the data transmission apparatuses. The receiver may be further configured to receive the segments using the buffer map.

The apparatus for receiving data may further include a data rate calculator configured to calculate a data rate with respect to each of the sessions. The congestion decision unit may be further configured to determine whether the network is congested based on the calculated data rate.

The receiver may be further configured to receive the segments over different networks corresponding to the data transmission apparatuses.

Where a number of sessions with the data rate decreased by greater than or equal to a predetermined threshold is greater than or equal to a predetermined ratio among the sessions, the congestion decision unit may determine the network is congested.

The data rate calculator may be further configured to calculate the data rate based on an amount of data received using each of the sessions during a predetermined period of time, and a round trip time with respect to each of the sessions.

The waiting time may be determined based on an average round trip time with respect to the sessions.

The apparatus for receiving data may further include a transmitter configured to transmit reception confirmation information associated with a segment received using the suspension session before the waiting time, to a data transmission apparatus corresponding to the suspension session during the waiting time.

In another aspect, there is provided a method of receiving data, the method including receiving, from data transmission apparatuses, segments of data, using sessions corresponding to the data transmission apparatuses, determining whether a network to be utilized by a corresponding segment is congested, based on a status of each of the sessions, selecting a suspension session from the sessions where the network is determined to be congested, and suspending reception of the corresponding segment with respect to the suspension session during a waiting time.

The method of receiving data may further include generating a buffer map that includes information associated with at least one data transmission apparatus including the segments among the plurality of data transmission apparatuses. The receiving of the segments may include receiving the segments using the buffer map.

The method of receiving data may further include calculating a data rate with respect to each of the sessions. The determining whether the network to be utilized by the corresponding segment is congested may include determining whether the network is congested based on the data rate with respect to each of the sessions.

The determining whether the network to be utilized by the corresponding segment is congested may include determining the network is congested where a number of sessions with the data rate decreases by greater than or equal to a predetermined threshold is greater than or equal to a predetermined ratio among the sessions.

The calculating the data rate may include calculating the data rate based on an amount of data received using each of the sessions during a predetermined period of time, and a round trip time with respect to each of the sessions.

The waiting time may be determined based on an average round trip time with respect to the sessions.

The method of receiving data may further include transmitting reception confirmation information associated with a segment received using the suspension session before the waiting time, to a data transmission apparatus corresponding to the suspension session during the waiting time.

In still another aspect, there is provided a computer-readable storage medium storing a program to implement a method of receiving data, the method including receiving, from data transmission apparatuses, segments of data, using sessions corresponding to the data transmission apparatuses, determining whether a network to be utilized by a corresponding segment is congested, based on a status of each of the sessions, selecting a suspension session from the sessions where the network is determined to be congested, and suspending reception of the corresponding segment with respect to the suspension session during a waiting time.

Other features and aspects will be apparent from the following detailed description, the drawings, and the claims.

Figure 1:
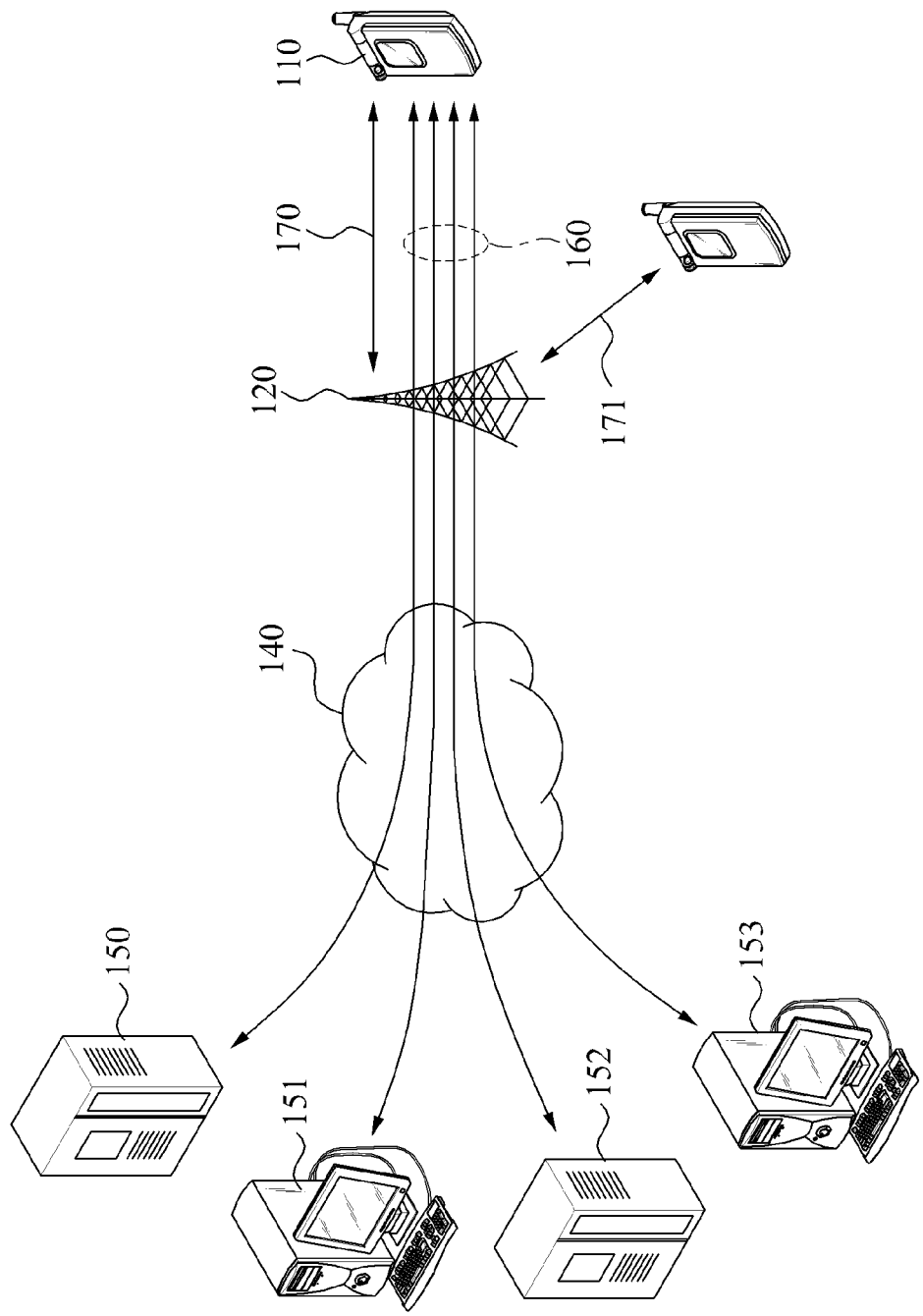
FIG. 1 is a diagram illustrating an example of a mobile network.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

The term "data transmission apparatus" used herein may include, for example, a peer, and the term "data reception apparatus" used herein may include, for example, a peer-to-peer (P2P) device.

FIG. 1 illustrates an example of a mobile network.

Referring to FIG. 1 for the purposes of example, a data reception apparatus 110 receives data over a network 140. The data reception apparatus 110 may receive data from any number of data transmission apparatuses 150, 151, 152, and 153. For example, the data transmission apparatuses 150, 151, 152, and 153 may include a portion of or all of data to be received by the data reception apparatus 110.

In the example of FIG. 1, the data reception apparatus 110 is connected to the network 140 via a base station 120. The data reception apparatus 110 may receive data using data sessions 160. The data reception apparatus 110 may also receive voice data from a mobile phone 171 using a voice session 170.

Since an amount of data transmission using the data sessions 160 may be great and a number of the data sessions 160 may be large, a great load in the network 140 may result. However, since an amount of transmission using the voice session 170 may be small and a number of the voice sessions 170 may be small, it may not cause great load in the network 140.

Where the load of the network 140 is very great, a data transmission performance of the network 140 may decrease.

Where an amount of data transmission is very great, the network 140 may become paralyzed. In this case, even a voice data transmission may be limited.

The data reception apparatus 110 may estimate a status of the network 140. Where the network 140 is congested, the data reception apparatus 110 may decrease an amount of data transmission. The network 140 may recover from the congested status and thus the data transmission apparatus 110 may receive the voice data using the network 140.

Where an amount of data transmission is very great, the data reception apparatus 110 may decrease the amount of data transmission. Where the amount of data transmission decreases, resources of the data reception apparatus 110 may be utilized to receive the data and the voice data.

Figure 2:
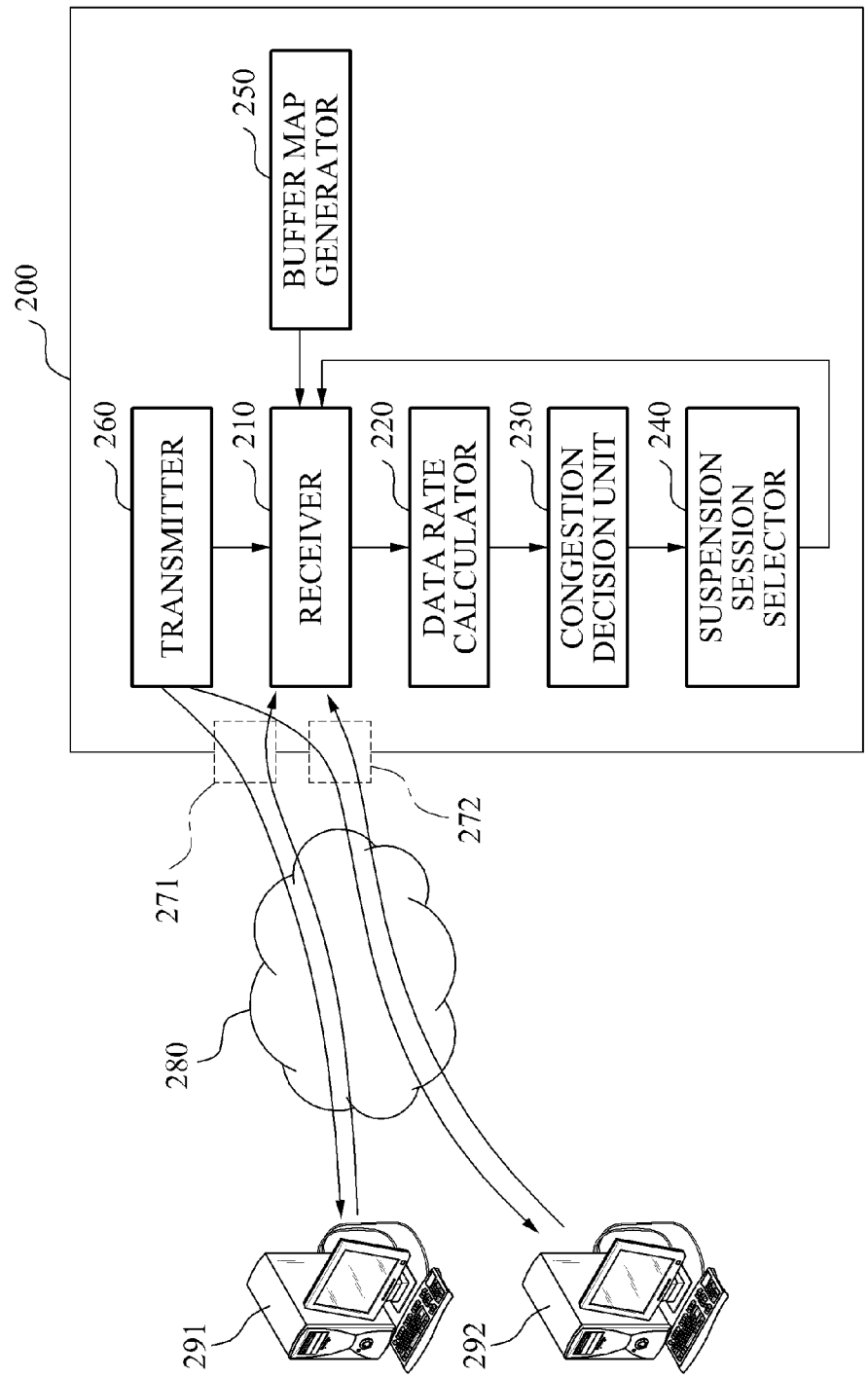
FIG. 2 is a diagram illustrating an example of a data reception apparatus.

FIG. 2 illustrates an example of a data reception apparatus 200. Referring to FIG. 2, the data reception apparatus 200 includes a receiver 210, a data rate calculator 220, a congestion decision unit 230, a suspension session selector 240, a buffer map generator 250, and a transmitter 260.

The receiver 210 may receive segments from data transmission apparatuses 291 and 292 using sessions 271 and 272, which correspond to the data transmission apparatuses 291 and 292. The sessions 271 and 272 may not be added to the data reception apparatus 200 in a hardware aspect. However, the sessions may be described as a physical portion of the data reception apparatus 200 for ease of description. Each of the sessions 271 and 272 may be generated and managed in a session layer of the data reception apparatus 200.

Data to be received by the data reception apparatus 200 may include a plurality of segments.

Hereinafter, an example of a concept where the segments constitute the data and a structure of a buffer map is described with reference to FIG. 3.

Figure 3:
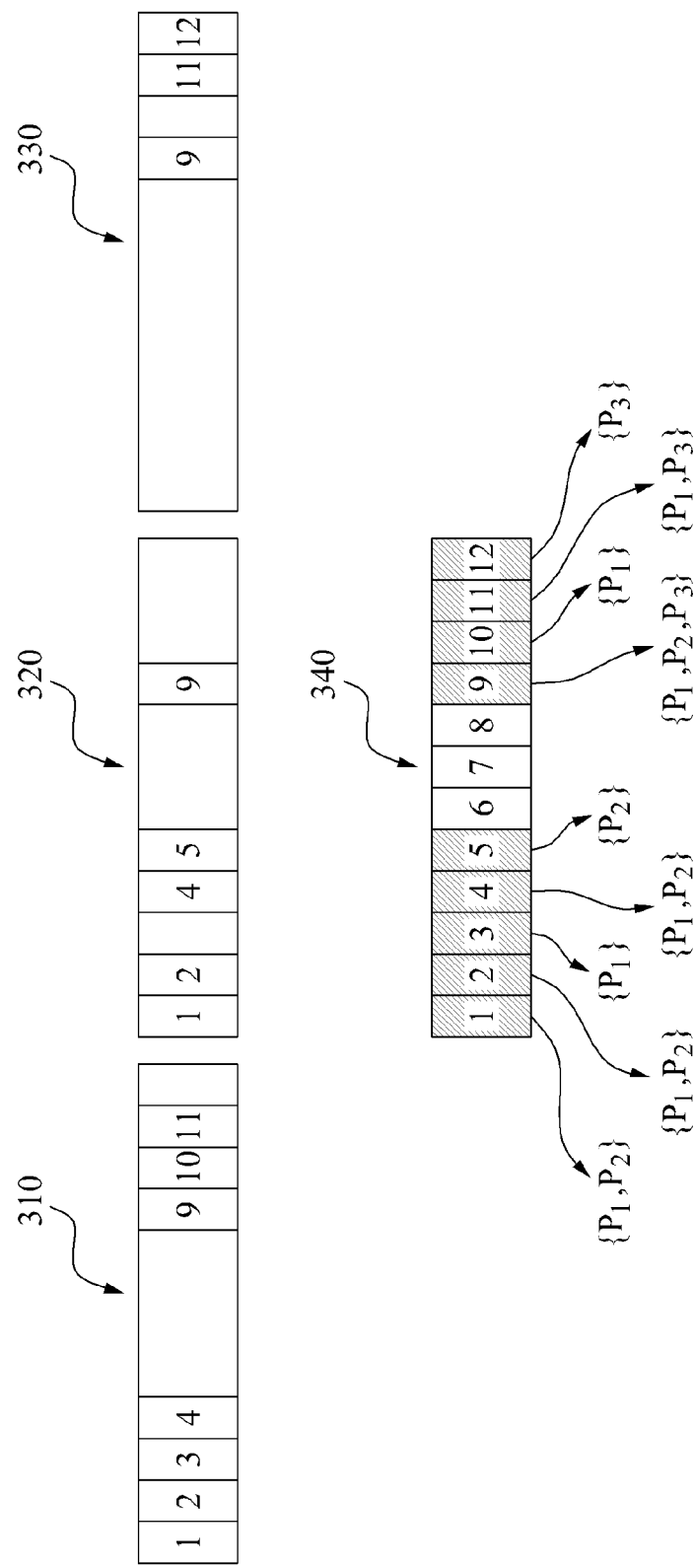
FIG. 3 is a diagram illustrating an example of a buffer map.

FIG. 3 illustrates an example of a buffer map 340.

The buffer map 340 shows segments of data that are included in each data transmission apparatus.

In this example, it is presumed that the data includes 12 segments.

Referring to data 310 included in a first data transmission apparatus $P_1$, the first data transmission apparatus $P_1$ includes a first segment, a second segment, a third segment, a fourth segment, a ninth segment, a tenth segment, and an eleventh segment.

Referring to data 320 included in a second data transmission apparatus $P_2$, the second data transmission apparatus $P_2$ includes the first segment, the second segment, the fourth segment, a fifth segment, and the ninth segment.

Referring to data 330 included in a third data transmission apparatus $P_3$, the third data transmission apparatus $P_3$ includes the ninth segment, the eleventh segment, and a twelfth segment.

Referring to the buffer map 340 with respect to the data, a data reception apparatus may receive the first segment, the second segment, and the fourth segment from the first data transmission apparatus $P_1$ and the second data transmission apparatus $P_2$. The data reception apparatus may also receive the third segment and the tenth segment from the first data transmission apparatus $P_1$.

The buffer map 340 includes information associated with a data transmission apparatus that may include and transmit corresponding segments.

Referring again to FIG. 2, the buffer map generator 250 may generate a buffer map. The receiver 210 may receive a segment from a data transmission apparatus corresponding to the segment using the buffer map.

Figure 4:
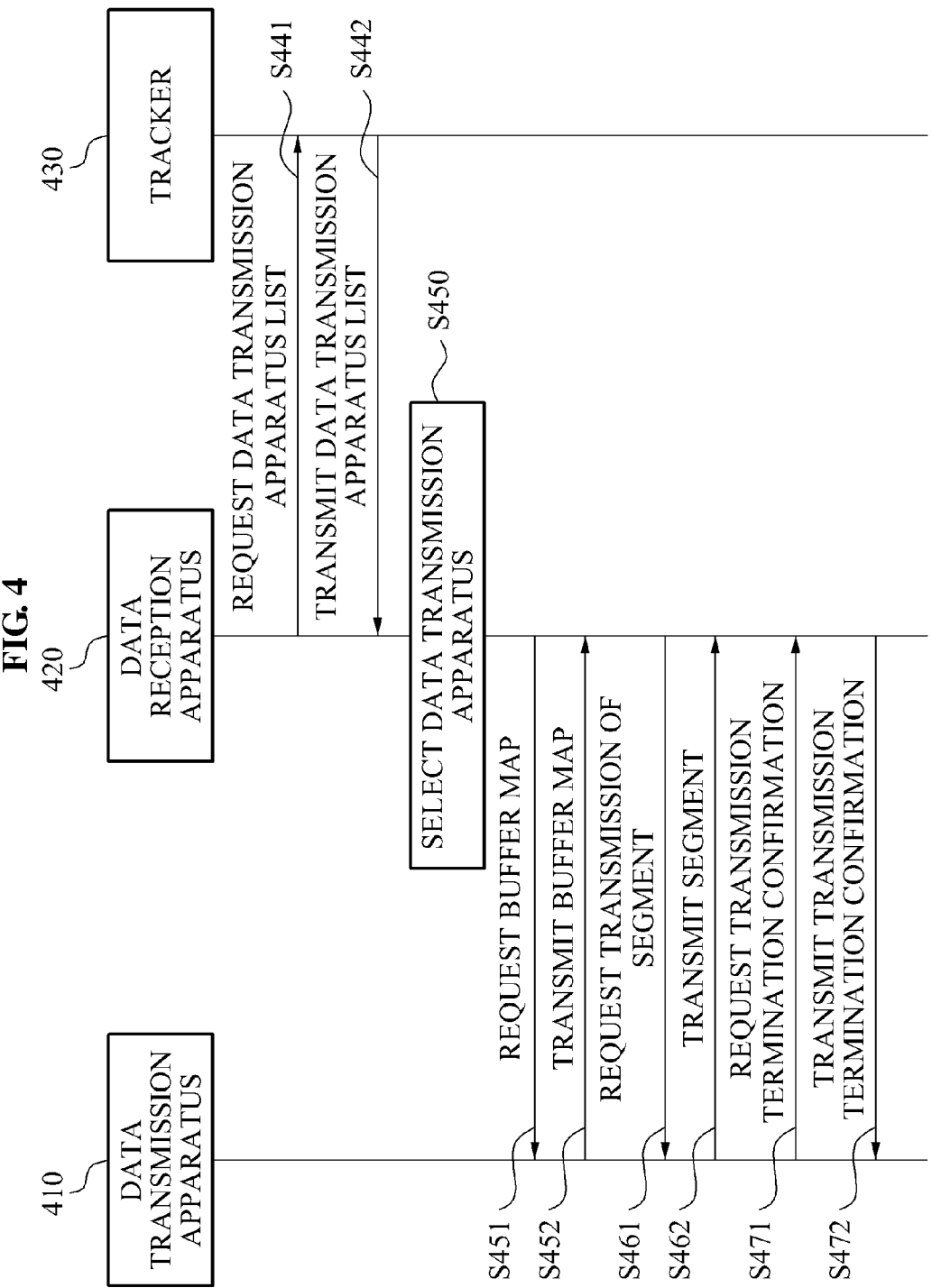
FIG. 4 is a flowchart illustrating an example of a process for generating a buffer map.

FIG. 4 illustrates an example of a process for generating a buffer map.

At operation S441, a data reception apparatus 420 requests a tracker 430 for a data transmission apparatus list. The data transmission apparatus list may include a list of data transmission apparatuses that include a portion of or all of data to be received by the data reception apparatus 420.

At operation S442, the data reception apparatus 420 receives the data transmission apparatus list from the tracker 430.

At operation S450, the data reception apparatus 420 selects a data transmission apparatus 410 including the data from all the accessible data transmission apparatuses, based on the data transmission apparatus list.

At operation S451, the data reception apparatus 420 requests the selected data transmission apparatus 410 for a buffer map.

At operation S452, the data reception apparatus 420 receives the buffer map from the selected data transmission apparatus 410. In this example, the buffer map may include information associated with segments included by the selected data transmission apparatus 410 among segment constituting the data. The data reception apparatus 420 may receive a buffer map from data transmission apparatuses and reconfigure a buffer with respect to the data using the received buffer map. The reconfigured buffer map may include information associated with the data transmission apparatuses including corresponding segments.

At operation S461, the data reception apparatus 420 selects a segment included in the data transmission apparatus 410 based on the received buffer map, and requests the data transmission apparatus 410 for transmission of the selected segment.

At operation S462, the data reception apparatus 420 receives the segment from the data transmission apparatus 410. The data reception apparatus 420 may generate a session corresponding to the selected data transmission apparatus 410 in order to receive the segment.

At operation S471, the data reception apparatus 420 requests the data transmission apparatus 410 for a transmission termination confirmation with respect to the data.

At operation S472, the data reception apparatus 420 receives the transmission termination confirmation from the data transmission apparatus 410. The data reception apparatus 420 may abolish the session generated at operation S462.

Referring again to the example in FIG. 2, the data rate calculator 220 may calculate a data rate with respect to each of the sessions 271 and 272. The data rate calculator 220 may calculate the data rate based on an amount of data received using each of the sessions 271 and 272 during a predetermined period of time, and a round trip time with respect to each of the sessions 271 and 272.

The round trip time may denote an amount of time in which a packet transmitted from the data reception apparatus 200 is transferred to each of the data transmission apparatuses 291 and 292 over a network 280, and a response signal for the packet is returned to the data reception apparatus 200 over the network 280.

The data rate calculator 220 calculates, as the data rate, a value that may be obtained by dividing the amount of data by a half of the round trip time.

The congestion decision unit 230 determines whether the network 280 to be utilized by a corresponding segment is congested, based on a status of each of the sessions 271 and 272. The congestion decision unit 230 determines whether the network 280 is congested based on the calculated data rate.

For example, where the data rate with respect to each of the sessions 271 and 272 decreases, the congestion decision unit 230 may determine the network 280 is congested.

According to one example, where a first session and a second session are used to receive data, a data rate of the first session may increase and a data rate of the second session may decrease depending on a network status.

Where a number of sessions with a decreased data rate is greater than a number of sessions with an increased data rate, the congestion decision unit 230 may determine the network 280 is congested. Where the number of sessions with the decreased data rate is greater than or equal to a predetermined ratio among the plurality of sessions, the congestion decision unit 230 may determine the network 280 is congested. Where the number of sessions with the data rate decreased by greater than or equal to a predetermined threshold is greater than or equal to the predetermined ratio among the plurality of sessions, the congestion decision unit 230 may determine the network 280 is congested.

Where the network 280 is determined to be congested, the suspension session selector 240 selects a suspension session from the sessions 271 and 272. An example of selecting the suspension session is further described with reference to FIGS. 5 and 6 below.

The receiver 210 may suspend a reception of the segment with respect to the suspension session during a predetermined waiting time.

Figure 5:
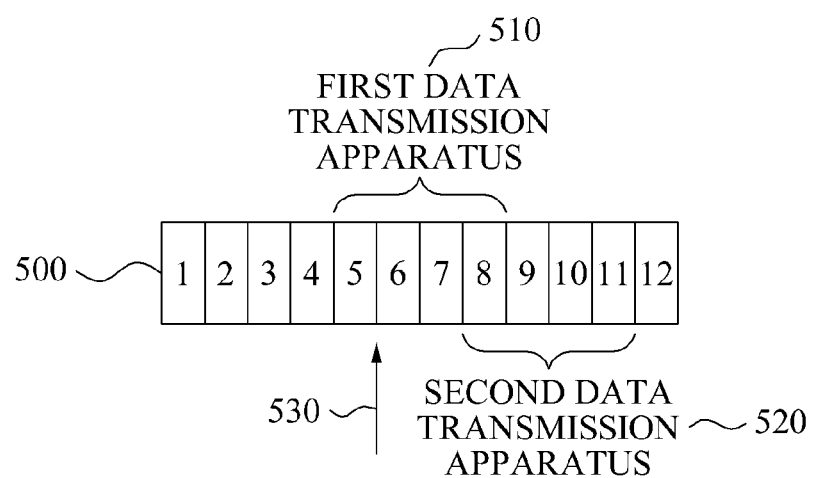
FIG. 5 is a diagram illustrating an example of a concept for selecting a suspension session.

FIG. 5 illustrates an example of a concept for selecting a suspension session. Referring to FIG. 5, a data reception apparatus receives streaming data 500 that includes 12 segments.

In this example, it is presumed that a first data transmission apparatus 510 includes a fifth segment, a sixth segment, a seventh segment, and an eighth segment, and a second data transmission apparatus 520 includes the eighth segment, a ninth segment, a tenth segment, and an eleventh segment.

The data reception apparatus may receive the fifth segment through the eighth segment from the first data transmission apparatus 510 using a first session, and receive the eighth segment through the eleventh segment from the second data transmission apparatus 520 using a second session.

It is also presumed that the data reception apparatus has received a first segment, a second segment, a third segment, a fourth segment, and the fifth segment before a network becomes congested.

Where the network is determined to be congested and a suspension session is selected from a plurality of sessions, the data reception apparatus may be presumed to have reproduced the first segment through the fifth segment as indicated by an arrow indicator 530.

To receive the sixth segment adjacent to the fifth segment, the data reception apparatus may select the second session as the suspension session.

During the waiting time, the data reception apparatus may receive the sixth segment using the first session, and reproduce the received sixth segment. Since a data reception using the second session is suspended during the waiting time, the load of the network may decrease and the data reception apparatus may seamlessly receive the streaming data 500.

The data reception apparatus may not select, as the suspension session, a session that may be used to transmit a segment with an impending reproduction point in time. The data reception apparatus may select, as the suspension session, a session that may be used to transmit a segment with a sufficient reproduction point in time.

Figure 6:
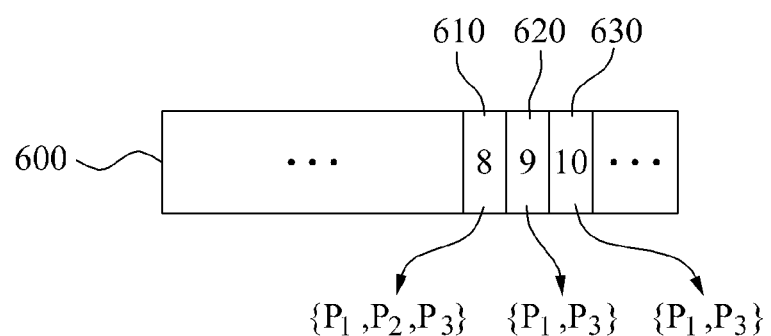
FIG. 6 is a diagram illustrating another example of a concept for selecting a suspension session.

FIG. 6 illustrates another example of a concept for selecting a suspension session. Referring to FIG. 6, a data reception apparatus receives streaming data 600 that includes a plurality of segments using a data reception method.

In this example, it is presumed that, where a network is determined to be congested and the suspension session is selected from a plurality of sessions, the data reception apparatus has received and reproduced a first segment through a seventh segment.

The data reception apparatus may select, as the suspension session, a remaining session excluding a session that may be used to receive an eighth segment 610, a ninth segment 620, and a tenth segment 630.

Referring to FIG. 6, a first data transmission apparatus $P_1$, a second data transmission apparatus $P_2$, and a third data transmission apparatus $P_3$ include the eighth segment. The first data transmission apparatus $P_1$ and the third data transmission apparatus $P_3$ include the ninth segment and the tenth segment. It may be presumed that the data reception apparatus receives a segment from the first data transmission apparatus $P_1$ using a first session, and receives a segment from the second data transmission apparatus $P_2$ using a second session, and receives a segment from the third data transmission apparatus $P_3$ using a third session.

The data reception apparatus may select, as the suspension session, a remaining session excluding the first session, the second session, and the fourth session from a plurality of sessions.

The data reception apparatus may select an additional suspension session from the first session, the second session, and the third session.

The data reception apparatus may receive the eighth segment 610, the ninth segment 620, and the tenth segment 630 using the first session and the third session. The data reception apparatus may receive the eighth segment 610.

The data reception apparatus may select, as the suspension session, the second session that may not be used to receive the ninth segment 620.

The data reception apparatus may receive the eighth segment 610, the ninth segment 620, and the tenth segment 630 using the first session and the third session. According to one example, the data reception apparatus may select, as a data transmission session, only a single session from a plurality of sessions and may select remaining sessions as suspension sessions. Data transmission using the suspension sessions may be suspended during a waiting time. Accordingly, a number of sessions used by the data reception apparatus to receive segments may be minimized during the waiting time. Since a duplicate transmission may be prevented, it may be possible to enhance a consumption of network resources during the waiting time.

The waiting time may be determined based on an average round trip time with respect to sessions. Where the average round trip time has a great value, the waiting time may increase.

The receiver 210 may suspend a reception of a segment with respect to the suspension session during the waiting time. The transmitter 260 may transmit reception confirmation information to a data transmission apparatus corresponding to the suspension session during the waiting time. The reception confirmation information transmitted from the transmitter 260 corresponds to reception information associated with a segment received by the receiver 210 using the suspension session before the network 280 becomes congested.

Where the data transmission apparatus corresponding to the suspension session receives the reception confirmation information, a session of the data transmission apparatus corresponding to the suspension session may be maintained.

Since the suspension session and the session of the data transmission apparatus corresponding to the suspension session are maintained during a suspension period of time, a segment reception may continue immediately after the suspension period of time, without a process of generating a new session.

Referring to FIG. 2, for example, the data reception apparatus receives data from the data transmission apparatuses 291 and 292 over the single network 280. According to one example, the data reception apparatus may receive data via separate networks corresponding to the data transmission apparatuses 291 and 292, respectively. For example, the receiver 210 may receive a segment from the data transmission apparatus 291 over a first network, and may receive a segment from the data transmission apparatus 292 over a second network.

The first network and the second network may be different from each other.

Figure 7:
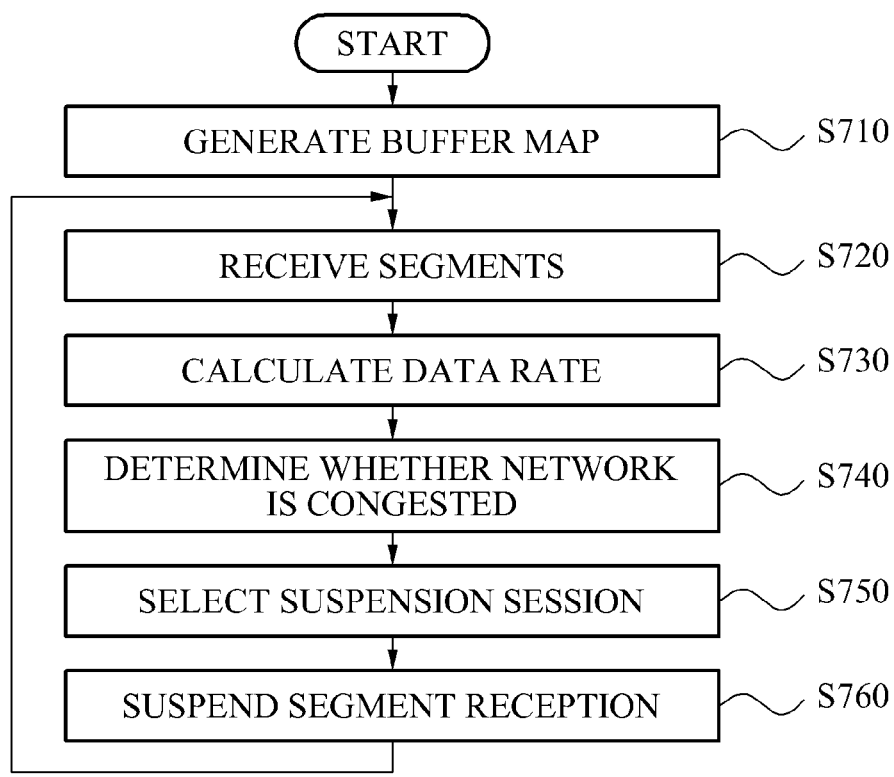
FIG. 7 is a flowchart illustrating an example of a method for receiving data.

FIG. 7 illustrates an example of a method for receiving data.

At operation S710, a data reception apparatus generates a buffer map. The buffer map may include information associated with at least one data transmission apparatus that includes segments of data among data transmission apparatuses.

At operation S720, the data reception apparatus receives segments from the data transmission apparatuses using sessions corresponding to the data transmission apparatuses. The data reception apparatus may determine which data transmission apparatus includes which segment based on the buffer map. Where the data reception apparatus desires to receive a predetermined segment, the data reception apparatus may determine which data transmission apparatus to request. The data reception apparatus may receive the segment from the determined data transmission apparatus.

At operation S730, the data reception apparatus calculates a data rate with respect to each of the sessions. The data reception apparatus may calculate the data rate based on an amount of data received using each of the sessions during a predetermined period of time, and a round trip time with respect to each of the sessions.

The data reception apparatus may calculate, as the data rate, a value that is obtained by dividing the amount of data by a half of the round trip time.

At operation S740, the data reception apparatus determines whether a network to be utilized by a corresponding segment is congested. The data reception apparatus may determine whether the network is congested based on the calculated data rate.

For example, where the data rate decreases, the data reception apparatus may determine the network is congested at operation S740.

Where a number of sessions with a decreased data rate is greater than a number of sessions with an increased data rate, the data reception apparatus may determine the network is congested at operation S740.

Where a number of sessions with a data rate decreased by greater than or equal to a predetermined threshold is greater than or equal to a predetermined ratio among the sessions, the data reception apparatus may determine the network is congested at operation S740.

Where the network is determined to be congested, the data reception apparatus selects a suspension session from the sessions at operation S750.

At operation S760, the data reception apparatus suspends a segment reception with respect to the suspension session during a waiting time. The waiting time may be determined based on an average round trip time with respect to the sessions. For example, where the average round trip time has a great value, the waiting time may increase. Accordingly, an amount of segments received by the data reception apparatus may decrease for a further longer period of time.

At operation S760, the data reception apparatus may transmit reception confirmation information to a data transmission apparatus corresponding to the suspension session during the waiting time. In this example, the reception confirmation information transmitted from the data reception apparatus corresponds to reception confirmation information associated with a segment received using the suspension session before a suspension period of time starts. Where the data transmission apparatus corresponding to the suspension session receives the reception confirmation information, a session of the data transmission session corresponding to the suspension session may be maintained during the waiting time. For example, since the suspension session and the session of the data transmission session corresponding to the suspension session may be maintained during the waiting time, the segment reception may be resumed immediately after the waiting time.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program to instructions may be those specially designed and constructed, or they may be of the kind well-known and available to those having skill in the computer software arts. Examples of computer-readable media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and a computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus configured to receive data, comprising:
a processor comprising
a receiver configured to receive, from data transmission apparatuses, segments of data, using sessions corresponding to the data transmission apparatuses,
a congestion decision unit configured to determine whether a network utilized to transfer the segments is congested, based on a status of each of the sessions, and
a suspension session selector configured to select a suspension session from the sessions where the network is determined to be congested,
wherein the receiver is further configured to suspend reception of a corresponding segment using the suspension session during a waiting time and the waiting time is determined based on an average round trip time with respect to the sessions.

2. The apparatus of claim 1, further comprising:
a buffer map generator configured to generate a buffer map comprising information associated with at least one data transmission apparatus comprising the segments among the data transmission apparatuses,
wherein the receiver is further configured to receive the segments using the buffer map.

3. The apparatus of claim 1, further comprising:
a data rate calculator configured to calculate a data rate with respect to each of the sessions,
wherein the congestion decision unit is further configured to determine whether the network is congested based on the data rate with respect to each of the sessions.

4. The apparatus of claim 3, wherein the receiver is further configured to receive the segments over different networks corresponding to the data transmission apparatuses.

5. The apparatus of claim 3, wherein the congestion decision unit is further configured to determine that the network is congested where a number of sessions with the data rate decreased by greater than or equal to a predetermined threshold, is greater than or equal to a predetermined ratio among the sessions.

6. The apparatus of claim 3, wherein the data rate calculator is further configured to calculate the data rate with respect to each of the sessions based on an amount of data received using each of the sessions during a predetermined period of time, and based on a round trip time with respect to each of the sessions.

7. The apparatus of claim 1, further comprising:
a transmitter configured to transmit reception confirmation information associated with a segment received using the suspension session before the waiting time, to a data transmission apparatus corresponding to the suspension session during the waiting time.

8. A method of receiving data, the method comprising:
receiving, from data transmission apparatuses, segments of data, using sessions corresponding to the data transmission apparatuses;
determining whether a network utilized to transfer the segments is congested, based on a status of each of the sessions;
selecting a suspension session from the sessions where the network is determined to be congested; and
suspending reception of a corresponding segment using the suspension session during a waiting time, wherein the waiting time is determined based on an average round trip time with respect to the sessions.

9. The method of claim 8, further comprising:
generating a buffer map comprising information associated with at least one data transmission apparatus comprising the segments among the data transmission apparatuses,
wherein the receiving of the segments comprises receiving the segments using the buffer map.

10. The method of claim 8, further comprising:
calculating a data rate with respect to each of the sessions,
wherein the determining of whether the network is congested comprises determining whether the network is congested based on the data rate with respect to each of the sessions.

11. The method of claim 10, wherein the determining of whether the network is congested comprises determining that the network is congested where a number of sessions with the data rate decreased by greater than or equal to a predetermined threshold, is greater than or equal to a predetermined ratio among the sessions.

12. The method of claim 10, wherein the calculating of the data rate comprises calculating the data rate with respect to each of the sessions based on an amount of data received using each of the sessions during a predetermined period of time, and based on a round trip time with respect to each of the sessions.

13. The method of claim 8, further comprising transmitting reception confirmation information associated with a segment received using the suspension session before the waiting time, to a data transmission apparatus corresponding to the suspension session during the waiting time.

14. A non-transitory computer-readable storage medium storing a program to implement a method of receiving data, the method comprising:
receiving, from data transmission apparatuses, segments of data, using sessions corresponding to the data transmission apparatuses;
determining whether a network utilized to transfer the segments is congested, based on a status of each of the sessions;
selecting a suspension session from the sessions where the network is determined to be congested; and
suspending reception of a corresponding segment using the suspension session during a waiting time, wherein the waiting time is determined based on an average round trip time with respect to the sessions.

15. The apparatus of claim 3, wherein the data rate calculator is further configured to divide an amount of data received using each of the sessions during a predetermined period of time, by a half of a round trip time with respect to each of the sessions, to calculate the data rate with respect to each of the sessions.

16. The apparatus of claim 1, wherein the suspension session is used to transmit the corresponding segment without an impending reproduction point in time.

17. The apparatus of claim 7, wherein:
the data transmission apparatus corresponding to the suspension session is configured to maintain a session corresponding to the suspension session during the waiting time where the data transmission apparatus receives the reception confirmation information; and
the receiver is further configured to
maintain the suspension session during the waiting time, and
resume the reception of the corresponding segment using the suspension session after the waiting time.

* * * * *